US006306292B1

(12) United States Patent
Dell et al.

(10) Patent No.: US 6,306,292 B1

(45) **Date of Patent: *Oct. 23, 2001**

(54) FUEL FILTER WITH INTERNAL PRESSURE REGULATOR

(76) Inventors: Norman C. Dell, 908 Polo Pl., Auburn Hills, MI (US) 48326; Edward L. VanEgdom, 520 Forrest, Royal Oak, MI (US) 48067; Sam Tieu, 627 E. Sunnybrook, Royal Oak, MI (US) 48073; Wendell Jacobson, 21420 Broadstone Rd., Harper Woods, MI (US) 48225; Ron Puckett, 3200 Ivy Creek Rd., Gastonia, NC (US) 28056; John L. Kroha, 278 Rivard, Grosse Pointe, MI (US) 48230

( * ) Notice: Subject to any disclaimer, the term of this patent is extended or adjusted under 35 U.S.C. 154(b) by 0 days.

This patent is subject to a terminal disclaimer.

(21) Appl. No.: 09/498,715

(22) Filed: Feb. 7, 2000

Related U.S. Application Data

(63) Continuation of application No. 09/022,015, filed on Feb. 11, 1998, now Pat. No. 6,086,752.

(51) Int. Cl.[7] .................................................... B01D 35/02

(52) U.S. Cl. .................... 210/137; 123/514; 137/155.13; 210/416.4; 210/446

(58) Field of Search .................................... 210/109, 116, 210/137, 171, 172, 194, 232, 416.4, 428, 429, 446, 450, 455, 497.01; 137/115.13, 508, 549; 123/509, 510, 511, 514

(56) References Cited

U.S. PATENT DOCUMENTS

| | | | |
|---|---|---|---|
| 5,078,167 | 1/1992 | Brandt et al. . | |
| 5,094,747 | 3/1992 | Johnson . | |
| 5,365,906 | 11/1994 | Deweerdt . | |
| 5,402,817 | 4/1995 | Bueser . | |
| 5,433,241 | 7/1995 | Robinson . | |
| 5,435,344 | 7/1995 | Robinson et al. . | |
| 5,435,345 | 7/1995 | Robinson et al. . | |
| 5,533,478 | 7/1996 | Robinson . | |
| 5,584,318 | 12/1996 | Brandt . | |
| 5,647,328 | 7/1997 | Fournier et al. . | |
| 5,647,330 | 7/1997 | Sawert et al. . | |
| 5,649,561 | 7/1997 | Brandt . | |
| 5,673,670 | 10/1997 | Powell et al. . | |
| 5,830,348 * | 11/1998 | Vannoy et al. | 210/429 |
| 5,989,413 * | 11/1999 | Jauss et al. | 210/429 |
| 6,086,752 * | 7/2000 | Dell et al. | 210/429 |
| 6,213,413 * | 4/2001 | Schwegler et al. | 210/416.4 |

* cited by examiner

*Primary Examiner*—Joseph W. Drodge
(74) *Attorney, Agent, or Firm*—Millen, White, Zelano & Branigan, P.C.

(57) ABSTRACT

A fuel filter and pressure regulator assembly includes a housing, an inlet tube, an outlet and return tube each made of stainless steel. An annular filter element is disposed within the housing and abuts at one end a pressure regulator element which is mounted within an O-ring retainer that is fixed within the housing. A resilient device, such as a wave washer or O-ring, is compressed as the assembly is assembled. In operation, fuel flows in through the inlet tube which is radially offset at a first end of the housing and into an annular space around the annular filter element. The fuel then flows through the filter media and the filter element and out of the outlet tube which is aligned with a hollow core of the filter media. If fuel pressure is too high, the fuel then flows through the pressure regulator, out of the return tube and back to the fuel tank.

17 Claims, 3 Drawing Sheets

24
28
20
23
30
32

26

32
23
20
22
30
28

33
30
23
32
20
26
22

FUEL FILTER WITH INTERNAL PRESSURE REGULATOR

RELATED PATENT APPLICATION

This invention is a continuation of U.S. patent application Ser. No. 09/022,015, filed on Feb. 11, 1998, now U.S. Pat. No. 6,086,752.

FIELD OF THE INVENTION

This invention relates to fuel filters for internal combustion engines and, more particularly, this invention relates to fuel filters for internal combustion engines, wherein the fuel filters include pressure regulators associated therewith which return excess fuel to fuel tanks.

BACKGROUND OF THE INVENTION

Fuel filters and pressure regulators are frequently combined and adapted for combination with fuel pump systems, A fuel pump system typically fits in a sealed manner in an opening in wall of a fuel tank and contains an electrically operated fuel pump. Fuel that has entered the fuel pump from the fuel tank is pumped first through a fuel filter and pressure regulator assembly and then through a fuel line extending from the fuel pump system to a fuel rail assembly of an internal combustion engine. Fuel passing to the engine is filtered by the fuel filter, while the pressure is regulated by a pressure regulator juxtaposed with the fuel filter. Typically, the pressure regulator returns excess fuel to the fuel tank from the fuel filter and pressure regulator assembly. This allows the elimination of a return line from the engine to the tank.

It is, of course, important to configure the fuel filter and pressure regulator assembly to minimize the possibility of leaks and it is preferable to make the assembly convenient to both fabricate and assemble, while arranging the device so as to not require extensive modification of any associated fuel system components.

SUMMARY OF THE INVENTION

In view of the aforementioned considerations, it is a feature of the present invention to provide a new and improved fuel filter and pressure regulator assembly, wherein the assembly is leak resistant and is relatively convenient to assemble, while being configured for inclusion in a fuel system, wherein the fuel system need not be redesigned to accommodate the fuel filter pressure regulator assembly.

In view of these features and other features, the present invention is directed to a fuel filter and pressure regulator assembly comprising a housing having a first end and a second end, wherein the housing is formed about an axis and has a side wall, a first end wall at the first end thereof and a second end wall at the second end thereof. An annular filter element is disposed within the housing in spaced relation to the side wall to form a space therebetween. The annular filter element has a first end, a second end and a core, with the second end being at the second end wall of the housing. A pressure regulating element is disposed within the housing, the pressure regulating element having a first end juxtaposed at the first end wall of the housing and a second end engaging the first end of the annular filter element. The annular filter element and the pressure regulating element are acted upon by a resilient device to axially position the elements within the housing. An inlet is in communication with the space between the side wall of the housing and the annular filter element, while an outlet through the second end wall of the housing is in communication with the core of the annular filter element. Consequently, fuel under pressure flows into the inlet, through the filter element, into the core of the filter element and through the outlet. A fuel return disposed in communication with the core of the annular filter element via the pressure regulating element returns fuel to a fuel tank when pressure inside the housing exceeds a preselected pressure.

In accordance with a further aspect of the invention, the assembly is made of stainless steel and, in accordance with further aspects of the invention, the first end wall is unitary with the side wall and the second end wall is attached and fixed to close the second end of the housing. Preferably, a resilient device such as an O-ring or wave spring is disposed between the pressure regulating element and the filter element to axially position the elements within the housing.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 2:
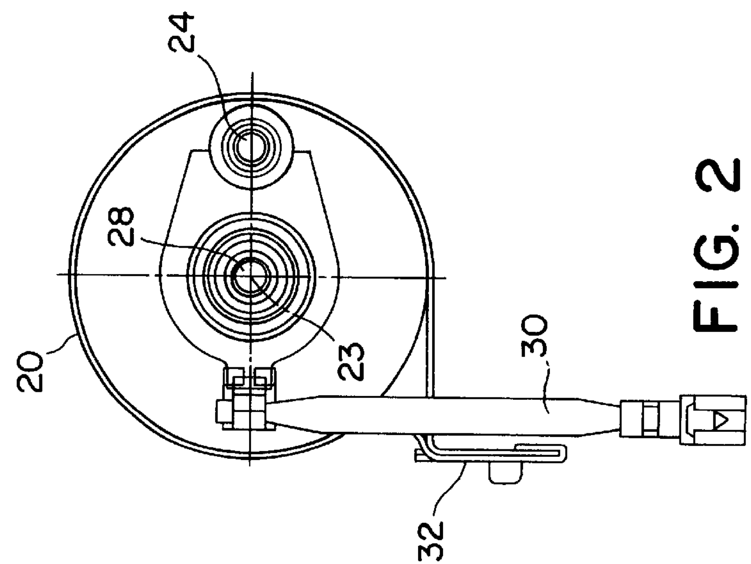
FIG. 2 is an end view of one embodiment of the assembly of FIG. 1.
Figure 1:
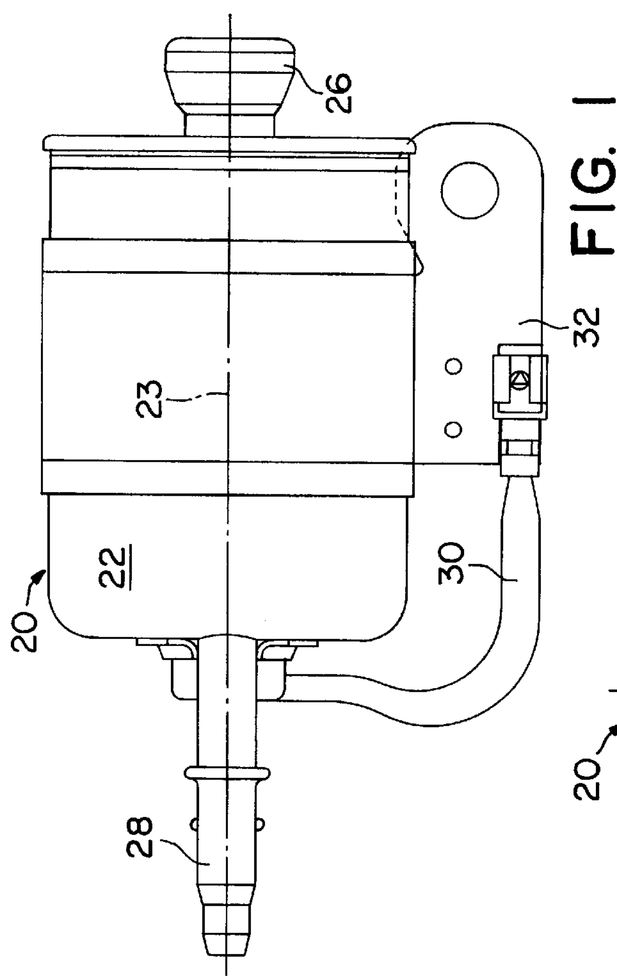
FIG. 1 is a side view of a fuel filter and pressure regulator assembly configured in accordance with the present invention.
Figure 3:
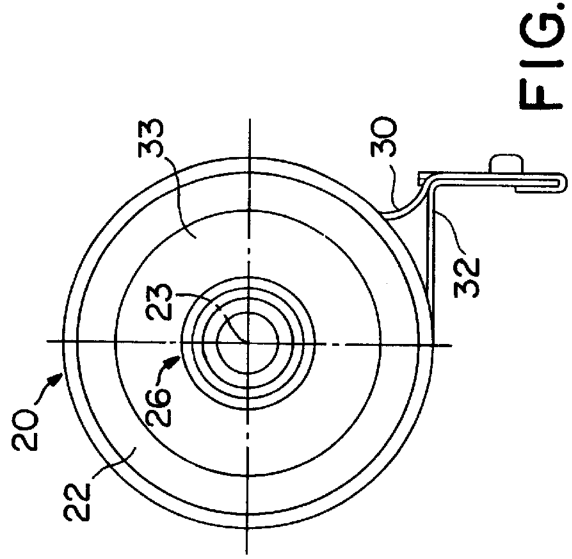
FIG. 3 is an end view of the opposite end of the assembly of FIGS. 1 and 2.
Figure 5:
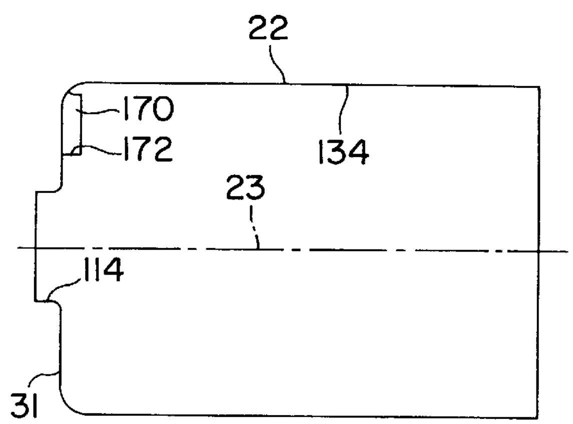
FIG. 5 is a side elevation of a stainless steel housing enclosing a fuel filter and pressure regulator shown in FIG. 4.
Figure 6:
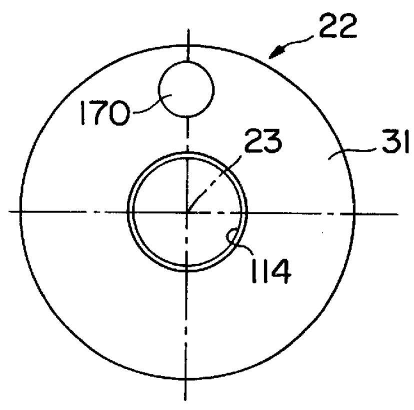
FIG. 6 is an end view of a first end of the housing of FIG. 5.

Referring now to FIGS. 1–3, there is shown a fuel filter and pressure regulator assembly 20 configured in accordance with the principles of the present invention. The assembly 20 includes a cylindrical housing 22 formed about an axis 23 (see also FIGS. 5 and 6), a fuel inlet 24, a fuel outlet 26 and a fuel return 28. Fuel drawn from a fuel pump (not shown) connected to a fuel tank (not shown) enters through the inlet 24, flows through a filter within the housing 22 and exits through the outlet 26. If pressure is too high within the housing 22, excess fuel is returned to the tank (not shown) by the fuel return 28. Optionally, a grounding strap 30 extends from a first end wall 31 unitary with the front of the housing 22 to a bracket 32. A second end wall 33 of the housing 22 is welded thereto.

Figure 4:
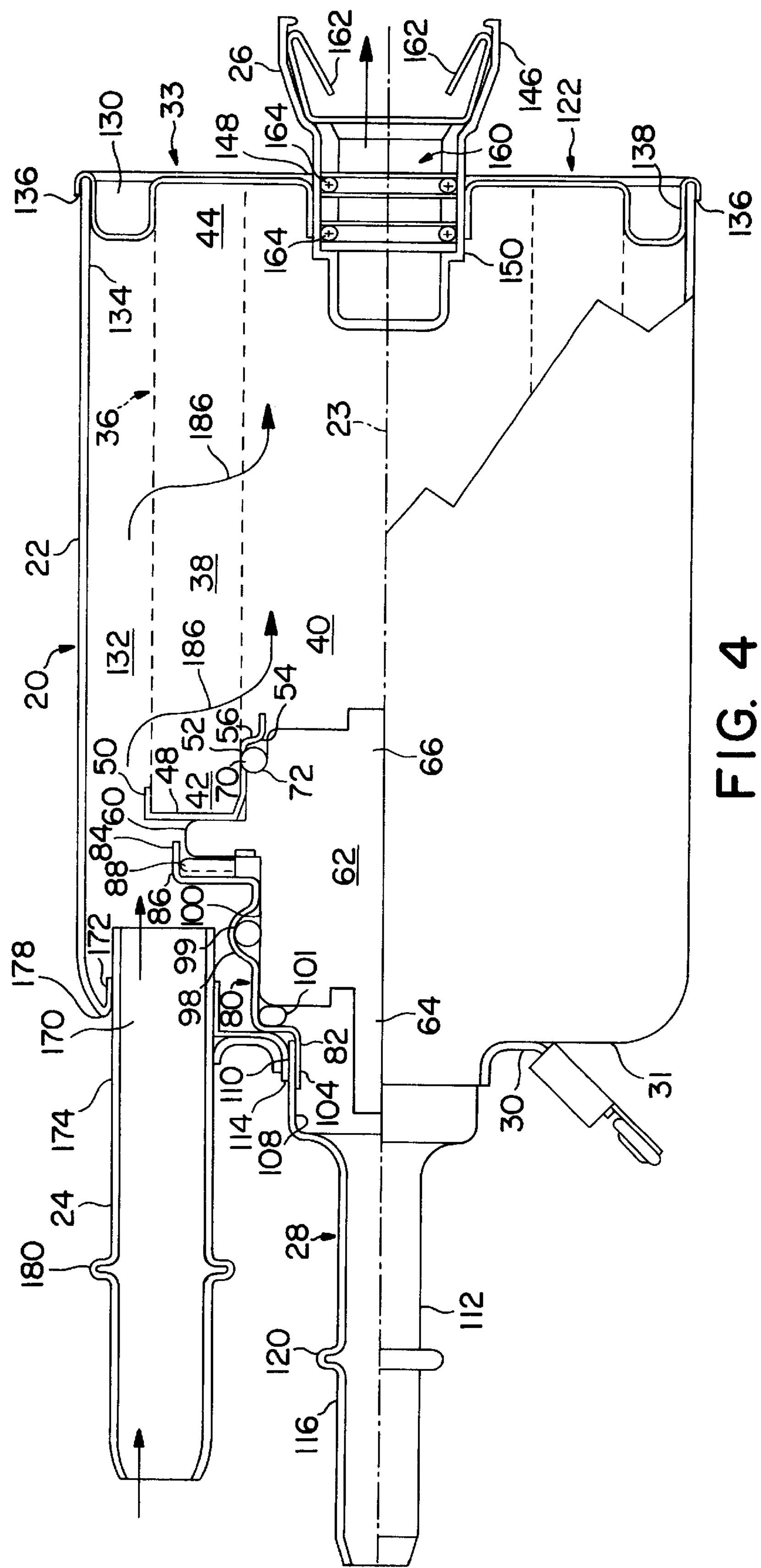
FIG. 4 is an enlarged side elevation of the fuel filter and pressure regulator assembly of FIGS. 1–3.

Referring now to FIG. 4, the housing 22 of the fuel filter and pressure regulator assembly 20 has therein an annular filter element 36 which includes an annular filter media 38 defining a hollow central core 40. The filter media 38 has a first end 42 and .second end 44, The first end 42 has a filter element cap 46 (see also FIGS. 7 and 8) thereon which seals the first end of the filter element 38. The filter element cap 46 is annular in configuration and has an end plate portion 48 and an outer lip 50 which cooperate with an inner collar 52 to seal off the first end 42 of the filter media 38. The inner collar 52 has a step 54 thereon defining a shoulder 56 and projects into the hollow core 40 of the filter element 38.

The filter element cap 46 abuts a radially projecting peripheral flange 60 of a pressure regulating element 62. The pressure regulating element 62 has a first end portion 64 and a second end portion 66. The first end portion 64 is disposed adjacent the first end 31 of the housing 22, while the second end portion 66 projects into the hollow a core 40 of the filter element 38. An O-ring 70 seated on the shoulder 56 of the filter element cap 46 engages a shoulder 72 on the second end portion 66 of the pressure regulator element 62 to seal the filter element 38 with respect to the pressure regulator element 62.

Pressure regulating element 62 is of a standard configuration similar to the pressure regulating element disclosed in patents such as U.S. Pat. Nos. 5,435,345 and 5,435,344, available from Siemens Automotive LP of Auburn Hills, Mich.

Figure 9:
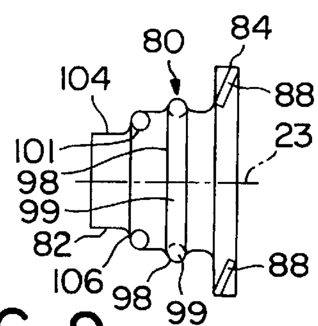
FIG. 9 is a side elevation of an O-ring retainer used to retain a modular pressure regulating element.
Figure 10:
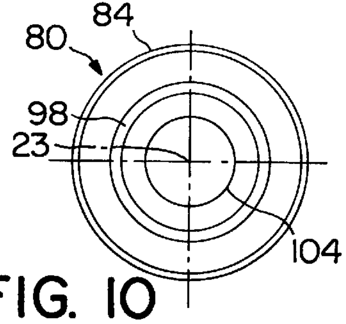
FIG. 10 is an end view of the O-ring retainer of FIG. 9.

The pressure regulator element 62 has a cylindrical portion 74 which within an O-ring retainer 80 (shown in isolation in FIGS. 9 and 10). The O-ring retainer 80 has a first end 82 and a second end 84. The second end 84 has a collar portion 86 with a diameter slightly greater than the diameter of the flange 60 on the pressure regulator element 62. In accordance with a first embodiment of the invention, the collar portion 86 receives therein a wave spring 88 which bears against the flange 60 of the pressure regulating element 62 (see FIG. 4) to urge the pressure regulating element against the filter element cap 46 and thus against the filter element 36 to urge the filter element towards the second end wall 32 of the housing 22. In accordance with the first embodiment of the invention, the O-ring retainer 82 has an intermediate portion 96 which includes an O-ring seat 98 that receives an O-ring 99 that radially seals with a cylindrical portion 100 of the pressure regulating element 62 so as to seal therewith. When a wave spring 88 is utilized, the O-ring 99 provides a seal between the O-ring retainer 80 and the pressure regulating element 62.

Figure 7:
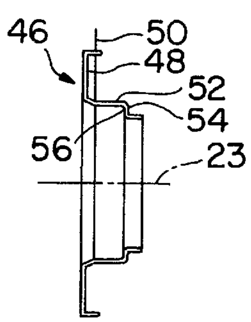
FIG. 7 is a side elevation of a filter element cap.
Figure 8:
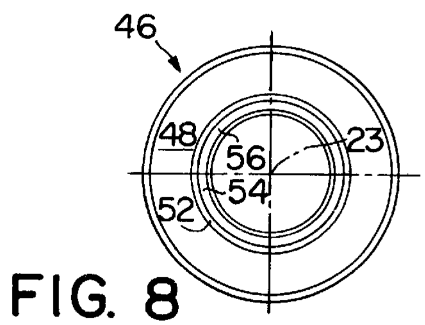
FIG. 8 is an end view of the filter element cap of FIG. 7.

In a second and preferred embodiment, the O-ring 99 and wave spring 88 are replaced by a single O-ring 101 (see FIG. 7). The O-ring 101 both seals with an end face 102 of the pressure regulating element 62 and provides a resilient force urging the pressure regulating element 62 against the filter element cap 46 which in turn urges the filter element 36 toward the second end 33 of the housing 22.

As is seen in FIG. 9, the O-ring retainer 80 has a projecting end 104 joined to the intermediate portion 96 by a radial portion 106. The projecting end 104 is secured to an inner surface 108 of the return 28 by adhesive. The inner surface 108 of the return 28 is provided on an axially extending end flange 110 of a tube 112 that defines the return 28. The axially extending end flange 110 fits within an axially projecting lip 114 on the first end wall 31 of the housing 22 and is braised thereto. Accordingly, the O-ring retainer 82 abuts the inner surface of the first end wall 31 of housing 22 with the radially extending portion 106, while being adhered within the axially extending flange 110 of the tube 112. The tube 112 has a crimp 120 thereon which serves as a stop when the assembly 20 is mounted in a fuel system (not shown).

Figure 11:
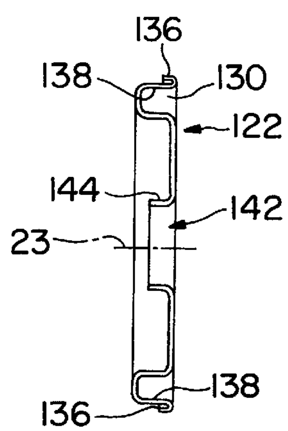
FIG. 11 is an end view of a stainless steel base which forms a second end wall when combined with the housing of FIGS. 5 and 6.
Figure 12:
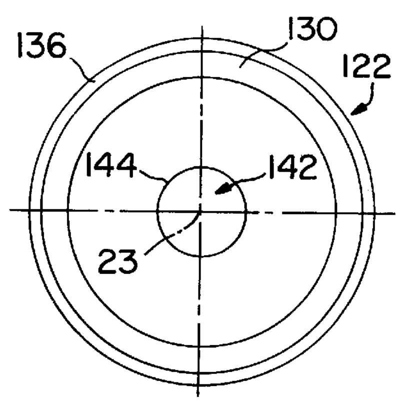
FIG. 12 is a side elevation taken along lines 12—12 of FIG. 11.

The filter media 38 of the filter element 36 abuts a base 122 which serves as an end plate for the filter media 38, as well as the second end 33 of the housing 22. Preferably, the base 122 is fixed to the filter media 38 by being adhered thereto to form an integral unit so that the base is part of the filter element 36 along with the filter element cap 46 and the filter media. The base 122 (see in isolation in FIGS. 11 and 12) includcs a V-shaped peripheral channel 130 which has a width equal to the width of an annular space 132 between the side wall 134 of the housing 22 and the filter media 38. The base 122 has a U-shaped slot 136 outboard of the peripheral channel 130 which receives the end of the side wall 134 of housing 22 therein. In order to fix the base 122 in place in a leak-proof relationship, that outer wall 138 of the channel 130 is laser-welded to the inner surface of the side wall 134 of housing 22.

The base 122 has a central opening 142 defined by an axially extending lip 144. The axially extending lip extends slightly within the hollow core 40 of the filter media 38 and receives therein a quick-connect component 146. The quick-connect housing 146 is secured by braising 148 at the juncture of the opening 142 and a barrel portion 150 of the housing 146. Disposed within the quick-connect housing 146 is a quick-connect coupling 160. The quick-connect coupling 160 includes spring arms 162 which retain a complementary male quick-connect coupling not shown on a fuel line (not shown) leading to an internal combustion engine (not shown). The quick-connect coupling 160 also includes O-rigs 164 which seal with the male quick-connect coupling (not shown) which is attached to the fuel line (not shown).

Referring again to FIG. 4, the first end 31 of the housing 22 has a second, radially offset opening 170 defined by an inwardly projecting lip 172. Received within the inwardly projecting lip 172 is inlet tube 174 which defines the inlet 24. The inlet tube 174 is braised at the juncture 178 with the first end 31 of the housing 22 in order to affix the inlet tube 174 in place. A stop 180 is formed on the inlet tube 174 by crimping the inlet tube.

In operation, fuel from a fuel tank (not shown) enters the inlet 24 defined by the inlet tube 174 and flows into the annular space 132. Since the fuel is under pressure, it passes through the filter media 38 in the direction of row 186 into the hollow core 40 of the filter media. The fuel then flows through the female quick-connect coupling 160, and a mating male quick-connect coupling (not shown), through a fuel line (not shown) to an engine (not shown). If the fuel pressure in the hollow core 40 of the filter element 36 (or anywhere within the housing 22) becomes excess, the pressure regulator element 62 opens so that excess fuel passes therethrough and out of the return 28 defined by tube 112 to the fuel tank (not shown).

The housing 22, base 122, inlet tube 174, quick-connect component 146 and return tube 112 are all preferably made of stainless steel (Type 304L). The O-ring retainer 80, the filter element cap 46 are both made of steel, preferably CRS and S.A.E. 108.

From the foregoing description, one skilled in the art can easily ascertain the essential characteristics of this invention and, without departing m the spirit and scope thereof, can make various changes and modifications of the invention to adapt it to various usages and conditions.

What is claimed is:

1. A fuel filter and pressure regulator assembly comprising:

a unitary housing having a single wall having a closed first end and an open second end, formed about an axis and having a side wall and a first end wall at the first end and a separate component closing the open second end of the single wall and forming a second end wall;

an annular filter element disposed within the housing in spaced relation to the side wall thereof to form a space therebetween, the annular filter element having a first end, a second end and a core, the second end being urged against the second end wall of the housing;

a pressure regulating element disposed within the housing, the pressure regulating element having a first end juxtaposed at the first end wall of the housing and a second end engaging the first end of the annular filter element;

a resilient device acting on the elements to axially position the elements within the housing;

an inlet disposed at the first end wall of the housing in communication with the space between the side wall of the housing and the filter element;

an outlet through the second end wall in communication with the core of the filter element, wherein fuel under pressure flows into the inlet, through the filter element, into the core of the filter element and out of the assembly through the outlet; and a fuel return projecting from the first end of the housing in communication with the core through the pressure regulating element for returning fuel to a fuel tank when pressure inside the housing exceeds a selected pressure.

2. An assembly according to claim 1, wherein the housing is made of stainless steel.

3. An assembly according to claim 2, wherein the first end wall is unitary with the side wall and the second end wall is attached to the side wall in fluid tight engagement.

4. An assembly according to claim 3, wherein the resilient device is disposed between the first end wall of the housing and the pressure regulating element to urge the pressure regulating element toward the filter element and the filter element toward the second end wall of the housing.

5. The assembly according to claim 4, wherein the pressure regulating element is received slidably in a retainer and the resilient device disposed between the retainer and pressure regulating element.

6. The assembly of claim 5, wherein at least one seal is disposed between the retainer and the pressure regulating element.

7. The assembly of claim 6, wherein the seal is an O-ring radially engaging the pressure regulating element.

8. The assembly of claim 6, wherein the seal is an O-ring axially engaging the pressure regulating element.

9. The assembly of claim 6, wherein the return includes a tube having an enlarged end which is received in an opening through the first end wall of the housing and wherein the retainer is received and fixed within the enlarged end.

10. The assembly of claim 9, wherein the second end wall is a base which is an integral part of the filter element and which has a U-shaped peripheral channel projecting into the housing between the side wall and filter element.

11. An assembly according to claim 1, wherein the first end wall is unitary with the side wall and the second end wall is attached to the side wall in fluid tight engagement.

12. An assembly according to claim 11, wherein the resilient device is disposed between the first end wall of the housing and the pressure regulating element to urge the pressure regulating element toward the filter element and the filter element toward the second end wall of the housing.

13. An assembly according to claim 1, wherein the resilient device is disposed between the first end wall of the housing and the pressure regulating element to urge the pressure regulating element toward the filter element and the filter element toward the second end wall of the housing.

14. The assembly according to claim 13, wherein the pressure regulating element is received slidably in a retainer and the resilient device disposed between the retainer and pressure regulating element.

15. The assembly of claim 14, wherein at least one seal is disposed between the retainer and the pressure regulating element.

16. The assembly of claim 15, wherein the seal is an O-ring axially engaging the pressure regulating element.

17. The assembly of claim 1, wherein the return includes a tube having an enlarged end which is received in an opening through the first end wall of the housing and wherein the retainer is received and fixed within the enlarged end.

* * * * *